United States Patent
Han et al.

(10) Patent No.: US 10,486,942 B2
(45) Date of Patent: Nov. 26, 2019

(54) ELEVATOR INSTALLATION ROLLER WITH RESTRAINING ELEMENT

(71) Applicant: Inventio AG, Hergiswil (CH)

(72) Inventors: Lin Han, Shanghai (CN); Liang Deng, Shanghai (CN)

(73) Assignee: INVENTIO AG, Hergiswil (CH)

( * ) Notice: Subject to any disclaimer, the term of this patent is extended or adjusted under 35 U.S.C. 154(b) by 391 days.

(21) Appl. No.: 15/311,531

(22) PCT Filed: May 16, 2014

(86) PCT No.: PCT/CN2014/077664
§ 371 (c)(1),
(2) Date: Nov. 16, 2016

(87) PCT Pub. No.: WO2015/172379
PCT Pub. Date: Nov. 19, 2015

(65) Prior Publication Data
US 2017/0081151 A1  Mar. 23, 2017

(51) Int. Cl.
*B66B 15/02* (2006.01)
*B66B 15/04* (2006.01)
*F16H 55/36* (2006.01)
*B66B 9/00* (2006.01)

(52) U.S. Cl.
CPC .............. *B66B 15/02* (2013.01); *B66B 15/04* (2013.01); *F16H 55/36* (2013.01); *B66B 9/00* (2013.01); *F16H 2055/363* (2013.01)

(58) Field of Classification Search
CPC ....... B66B 11/08; B66B 11/06; B66B 11/062; B66B 11/0065; B66B 11/0076; B66B 15/04; B66B 7/062; F16H 15/02; F16H 55/36; F16H 2055/363
See application file for complete search history.

(56) References Cited

U.S. PATENT DOCUMENTS

| 8,839,912 B2 * | 9/2014 | Dominguez ........ B66B 11/0206 187/266 |
| 2015/0158703 A1 * | 6/2015 | Moser ..................... B66B 15/02 187/266 |
| 2015/0210511 A1 * | 7/2015 | Zapf ....................... B66B 15/04 187/266 |

FOREIGN PATENT DOCUMENTS

| CN | 1613742 A | 5/2005 |
| CN | 101565141 B | 10/2009 |
| CN | 201961925 U | 9/2011 |
| CN | 202901159 U | 4/2013 |
| CN | 103159116 B * | 6/2013 |
| CN | 203158975 U | 8/2013 |
| CN | 203159002 U | 8/2013 |
| JP | S5756672 U | 4/1982 |
| JP | 2006206202 A | 8/2006 |

(Continued)

OTHER PUBLICATIONS

Machine Translation of CN103159116 published 2013.*

*Primary Examiner* — Diem M Tran
(74) *Attorney, Agent, or Firm* — William J. Clemens; Shumaker, Loop & Kendrick, LLP

(57) ABSTRACT

In an elevator installation a belt-like support is guided over a roller. The roller includes at least one restraining element, which is arranged laterally of a roller contact surface. Lateral jumping-off of the belt-like support from the roller is thereby prevented. The restraining element additionally has a guide surface inclined toward the roller contact surface.

15 Claims, 2 Drawing Sheets

(56) References Cited

FOREIGN PATENT DOCUMENTS

| | | | |
|---|---|---|---|
| JP | 2012000679 | A | 1/2012 |
| JP | 2013170054 | A | 9/2013 |
| WO | 02074677 | A2 | 9/2002 |

* cited by examiner

ELEVATOR INSTALLATION ROLLER WITH RESTRAINING ELEMENT

FIELD

The present invention relates to an elevator installation and, in particular, to a design of a roller in this elevator installation.

BACKGROUND

Steel cables are conventionally used as support means for supporting and/or driving an elevator car in elevator installations. According to a development of such steel cables use is also made of belt-like support means comprising tensile carriers and a casing arranged around the tensile carriers. Such belt-like support means are, similarly to conventional steel cables, guided over drive pulleys and deflecting rollers in the elevator installation. However, by contrast to steel cables, belt-like support means are not guided in grooves in the deflecting rollers or drive pulleys, but the belt-like support means lie substantially on the deflecting rollers or drive pulleys.

In elevator installations, support means do not always run exactly perpendicularly to an axis of deflecting rollers or drive pulleys. The presence of diagonal tension can on the one hand be due to construction or on the other hand be caused by imprecise mounting of the elevator installation. Due to such diagonal tension of the support means there is the risk of the support means laterally slipping off a deflecting roller or a drive pulley. In order to prevent this it is sought to guide the belt-like support means laterally on deflecting rollers or drive pulleys. Thus, for example, use is made of cambered deflecting rollers on which support means of that kind are laterally guided to a certain extent. In order to prevent lateral jumping-off of the belt-like support means use is also made of elevated side edges at the deflecting rollers or drive pulleys. In addition, belt-like support means with longitudinal ribs and longitudinal grooves on the traction surface of the support means as well as on the traction surface of the deflecting rollers or drive pulleys are also known, which ribs and grooves engage and thus ensure lateral guidance of the belt-like support means on the deflecting rollers or drive pulleys.

However, it has proved that measures such as cambered deflecting rollers and drive pulleys, elevated side edges or longitudinal grooves in the support means cannot prevent lateral jumping-off of the support means in every instance. In particular, in the case of support means with longitudinal ribs it was observed that the support means due to diagonal tension was laterally displaced by one or more longitudinal ribs so that the support means protruded laterally beyond the deflecting roller without completely jumping off to the side. There is thus the risk that a support means at least partly jumps off a deflecting roller or a drive pulley to the side without this being recognized at safety systems of the elevator installation.

SUMMARY

It is therefore an object of the present invention to provide an elevator installation in which at least partial lateral jumping-off from rollers is reliably prevented. Such an arrangement shall additionally be economic to manufacture and robust in use.

This object is fulfilled by an elevator installation in which a belt-like support means is guided over a roller, wherein the roller comprises at least one restraining element. This restraining element is arranged laterally of a roller contact surface. The restraining element in that case comprises a guide surface inclined towards the roller contact surface.

The mounting of such a restraining element on a roller offers, at the outset, the advantage that lateral jumping-off of the belt-like support means can be significantly impeded or entirely prevented. In order to ensure the most economic and reliable operation possible of the elevator installation it is additionally of importance for the belt-like support means not to be damaged in the case of lateral displacement away from the roller contact surface. Through the provision of an inclined guide surface it can be ensured that a support means which is jumping off is guided back to the roller contact surface of the roller as gently as possible. Thus, an economic, robust and reliable solution is provided by the design proposed here.

In an exemplifying form of embodiment the restraining element has at the guide surface an inner diameter lying closer to the roller contact surface and an outer diameter spaced further from the roller contact surface, wherein the inner diameter is smaller than the outer diameter. Such a design of the restraining element offers the advantage that the guide surface rises towards the outside, so that a support means at least partially jumping off is guided back to the roller contact surface as gently as possible.

In an exemplifying form of embodiment the restraining element has a center bore, wherein a shaft of the roller is guided through this bore. A restraining element designed in this way has the advantage that it can be retrofitted in simple manner to existing rollers. In addition, mounting of such a restraining element can be managed simply and safely.

In an exemplifying form of embodiment the restraining element is rotatably mounted on the shaft. The restraining element can thereby be rotated on the shaft independently of the roller. This has the advantage that in the case of lateral jumping-off of the support means the restraining element and the roller can rotate on the shaft at different angular speeds. The restraining element can thus rotate at exactly the speed at which it is driven by the support means jumping off. In certain circumstances this speed can differ from an angular speed of the roller. As a result, there is less friction and a smaller risk of damage between the restraining element and the support means jumping off. In an advantageous development of this form of embodiment the restraining element comprises a bearing, preferably a ball bearing. Such a design of the restraining element has the advantage that the roller or the shaft does not have to be specially adapted. Such a restraining element can thus be retrofitted on already existing rollers.

In an exemplifying form of embodiment the restraining element is decoupled from the rotational movements of the roller contact surface. This can be achieved by the above-described rotatable mounting of the restraining element on the shaft or by another form of design. For example, the restraining element can be rotatably mounted laterally on the roller.

In an exemplifying form of embodiment the restraining element comprises at least one of steel, copper, aluminum and synthetic materials. Selection of the material of the restraining element can be carried out in dependence on the respective design of the belt-like support means or the elevator installation. In addition, the shape, surface property and materials of the roller contact surface can be individually adapted to the characteristics of the belt-like support means or the elevator installation.

In an exemplifying form of embodiment a respective restraining element is arranged on each side of the roller laterally of the roller contact surface, wherein the two restraining elements are arranged in mirror image relative to one another. Such an arrangement with two respective restraining elements of a roller has the advantage that lateral jumping-off of the belt-like support means towards both sides is prevented.

In an exemplifying form of embodiment the roller is a car deflecting roller. It has proved that the car deflecting rollers are particularly susceptible to belt-like support means jumping off laterally. Equipping of such car deflecting rollers with appropriate restraining elements is therefore particularly advantageous. In a further exemplifying form of embodiment the roller is a counterweight deflecting roller. Depending on the respective kind of elevator installation, counterweight deflecting rollers instead of car deflecting rollers can also be increasingly involved with belt-like support means which jump off. Equipping of these counterweight deflecting rollers with appropriate restraining elements can therefore be equally advantageous.

In an exemplifying form of embodiment the guide surface at the inner diameter directly adjoins the roller contact surface and is led up in outward direction towards the outer diameter of the guide surface. Such a design of the guide surface has the advantage that a belt-like support means which jumps off as well as return guidance thereof to the roller contact surface can take place as gently as possible for the support means and the roller as well as the restraining element.

In an exemplifying form of embodiment the guide surface has a linear or a concave or a convex cross-section. Depending on the respective design of the elevator installation or of the belt-like support means selection can be made of an ideal shape of the guide surface. In this regard, the cross-section of the belt-like support means is of particular significance. A rounded belt-like support means, for example, can require a differently shaped guide surface from a belt-like support means with edges.

In an exemplifying form of embodiment the belt-like support means has longitudinal structures on a traction side. Such longitudinal structures can be constructed as, for example, wedge ribs. Such longitudinal structures have the advantage that the belt-like support means can be laterally guided on the roller. For this purpose the roller contact surface is preferably formed with corresponding longitudinal structures which can engage in the longitudinal structures of the support means.

DESCRIPTION OF THE DRAWINGS

The invention is explained in more detail symbolically and by way of example on the basis of figures, in which.

DETAILED DESCRIPTION

Figure 1:
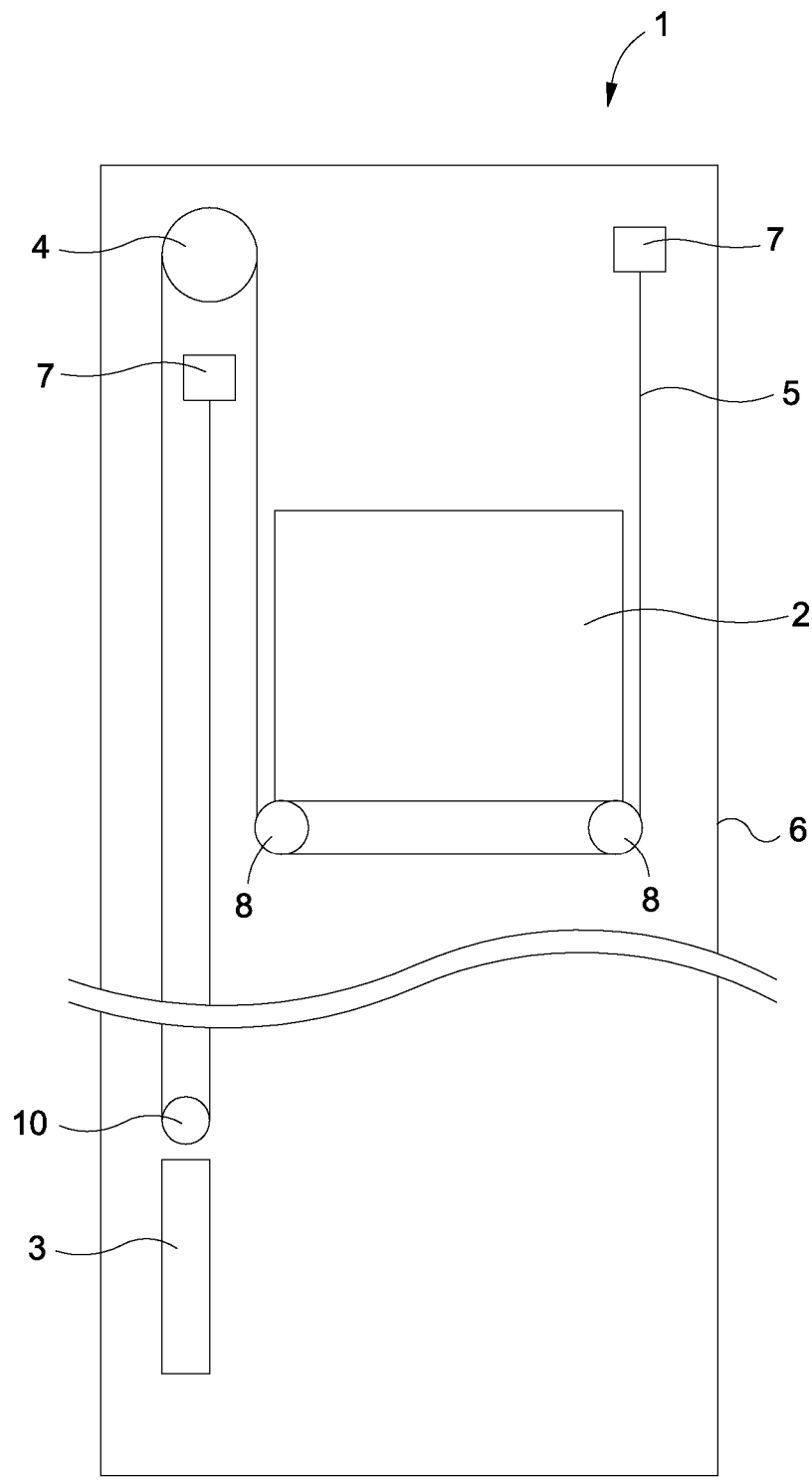
FIG. 1 shows a schematic illustration of an exemplifying elevator installation.

An exemplifying form of embodiment of an elevator installation 1 is illustrated in FIG. 1. The elevator installation 1 comprises a car 2, a counterweight 3, a drive and a belt-like support means 5. In that case, the belt-like support means 5 is fixed in the elevator installation 1 by a first support means fastening 7, guided over a counterweight deflecting roller 10, guided over a drive roller 4, guided over two car deflecting rollers 8 and fastened again in the elevator installation 1 by a second support means fastening 7.

In this embodiment the elevator installation 1 is arranged in a shaft 6. In an alternative form of embodiment (not illustrated) the elevator installation is arranged not in a shaft, but, for example, at an outer wall of a building.

The exemplifying elevator installation 1 in FIG. 1 comprises a counterweight 3. In an alternative form of embodiment, which is not illustrated, the elevator installation does not have a counterweight. Numerous other forms of embodiment of an elevator installation are additionally possible.

Figure 2:
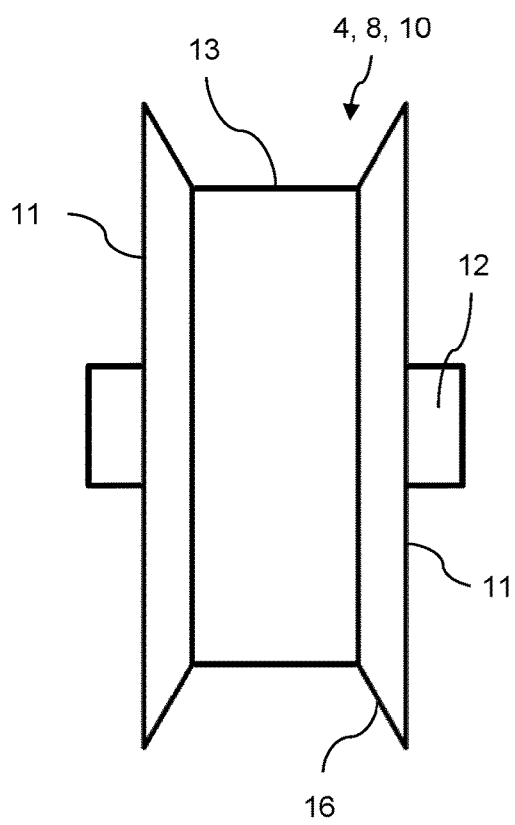
FIG. 2 shows a schematic illustration of an exemplifying roller.

An exemplifying form of embodiment of a roller 4, 8, 10 is illustrated in FIG. 2. This roller can be used as a drive roller or as a car deflecting roller or as a counterweight deflecting roller or as another deflecting roller in the elevator installation. In the illustrated form of embodiment the roller 4, 8, 10 has two restraining elements 11. In that case the restraining elements 11 are arranged in mirror image to one another. Each restraining element 11 is arranged on a respective side of the roller contact surface 13. In that case, a guide surface 16 of the restraining element 11 directly adjoins the roller contact surface 13. In the illustrated embodiment, not only the roller 4, 8, 10, but also the two restraining elements 11 are rotatably mounted on a common shaft 12.

Figure 3:
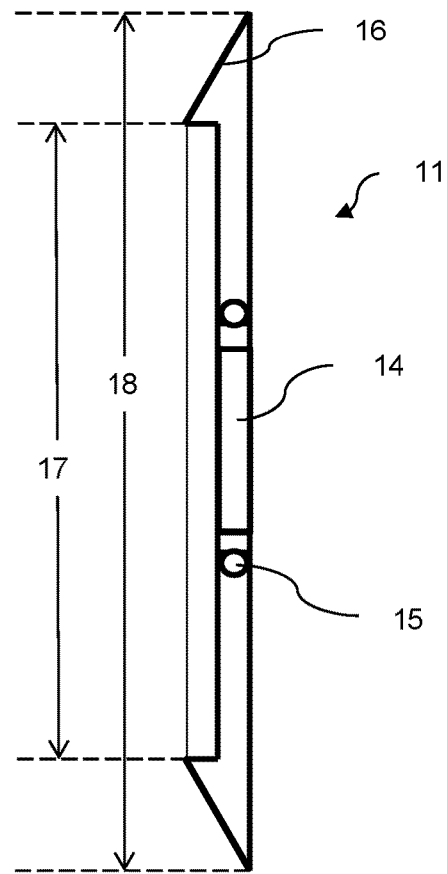
FIG. 3 shows a schematic illustration of an exemplifying restraining element.

An exemplifying form of embodiment of a restraining element 11 is illustrated in FIG. 3. The exemplifying restraining element 11 is in that case shown in cross-section. It has a guide surface 16, a bore 14 and a bearing 15. This restraining element 11 can thus be retrofitted to existing rollers. The guide surface 16 has, on a side facing the roller contact surface, an inner diameter 17 and, on a side facing away from the roller contact surface, an outer diameter 18. In that case the inner diameter 17 is smaller than the outer diameter 18. This has the consequence that the guide surface 16, starting from the roller contact surface 13, rises in an outward direction. Return of a belt-like support means which is jumping off can thus be ensured as gently as possible. The restraining element 11 also has a recess 19 formed at the inner diameter 17 for receiving an edge of the roller contact surface 13.

Figure 4:
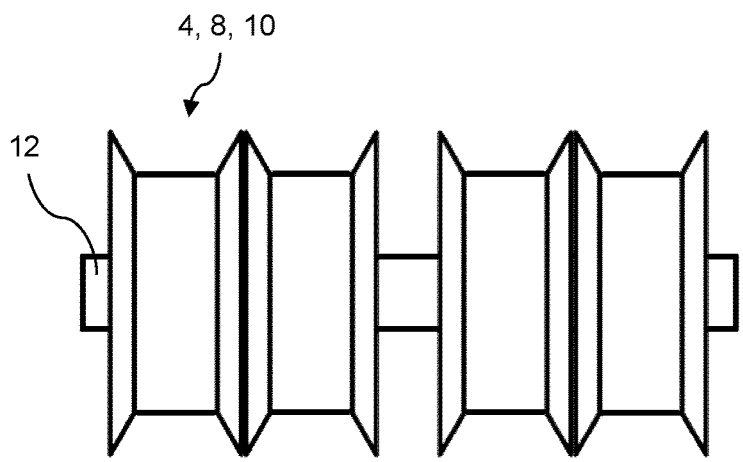
FIG. 4 shows a schematic illustration of several exemplifying rollers on a common shaft.

An exemplifying form of embodiment of several rollers 4, 8, 10 on a common shaft 12 is illustrated in FIG. 4. In this embodiment in each instance two adjacent rollers 4, 8, 10 are grouped to form a double group. Depending on the respective form of embodiment of the elevator installation an appropriately different arrangement of the rollers 4, 8, 10 on the shaft 12 can be selected. In the illustrated form of embodiment each roller is equipped with two respective restraining elements. Lateral jumping-off of each support means at the rollers 4, 8, 10 can thus be prevented.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator installation, in which a belt-like support is guided over a roller, comprising: the roller having at least one restraining element arranged laterally of a roller contact surface engaged by the belt-like support, wherein the restraining element has a guide surface inclined towards the roller contact surface, wherein the restraining element has a center bore and the restraining element is rotatably mounted on the shaft at the center bore, and wherein the restraining element is rotatable independent of a rotational movement of the roller contact surface.

2. The elevator installation according to claim 1 wherein the restraining element has an inner diameter and an outer diameter, the inner diameter lying laterally closer to the roller contact surface than the outer diameter, wherein the inner diameter is smaller than the outer diameter.

3. The elevator installation according to claim 1 wherein the restraining element includes a bearing mounting the restraining element on the shaft.

4. The elevator installation according to claim 3 wherein the bearing is a ball bearing.

5. The elevator installation according to claim 1 wherein the restraining element is formed of at least one of steel, copper, aluminum and synthetic materials.

6. The elevator installation according to claim 1 including two of the restraining element wherein a respective one of the two restraining elements is arranged on an associated side of the roller laterally of the roller contact surface and wherein the two restraining elements are arranged in mirror image with respect to one another.

7. The elevator installation according to claim 1 wherein the roller is a car deflecting roller.

8. The elevator installation according to claim 1 wherein the roller is a counterweight deflecting roller.

9. The elevator installation according to claim 1 wherein the roller is a drive roller.

10. The elevator installation according to claim 1 wherein the restraining element has an inner diameter laterally spaced from an outer diameter and wherein the guide surface at the inner diameter directly adjoins the roller contact surface and extends in an inclined outward direction towards the outer diameter.

11. The elevator installation according to claim 1 wherein the guide surface has one of a linear, a concave or a convex cross-section.

12. A roller for guiding a belt-like support in an elevator installation comprising: a roller contact surface engaged by the belt-like support and two restraining elements each having a guide surface inclined towards the roller contact surface, the two restraining elements being arranged on opposite sides of the roller laterally of the roller contact surface and wherein the two restraining elements are arranged in mirror image with respect to one another, wherein each of the restraining elements has a center bore and wherein a shaft of the roller is guided through the center bores thereby rotatably mounting the restraining elements on the shaft, and wherein each of the restraining elements is rotatable independent of a rotational movement of the roller contact surface.

13. The roller according to claim 12 wherein each of the restraining elements has an inner diameter and an outer diameter, the inner diameter lying laterally closer to the roller contact surface than the outer diameter, wherein the inner diameter is smaller than the outer diameter.

14. The roller according to claim 12 wherein each of the restraining elements includes a bearing mounting the restraining element on the shaft.

15. The roller according to claim 12 wherein each of the restraining elements has a recess formed therein for receiving an edge of the roller contact surface.

\* \* \* \* \*